United States Patent
Bindschedler et al.

(10) Patent No.: US 8,733,037 B2
(45) Date of Patent: May 27, 2014

(54) DEVICE FOR FIXING PLATES OR PANELS TO A COVER, AND RESULTING COMPOSITE COVER

(75) Inventors: Pierre Etienne Bindschedler, Obernai (FR); Rémi Perrin, Boersch (FR); Damien Fulcrand, Strasbourg (FR); Henri Desgouilles, Paris (FR); André Voges, Saint-Pierre (FR)

(73) Assignee: Soprema, Strasbourg (FR)

( * ) Notice: Subject to any disclaimer, the term of this patent is extended or adjusted under 35 U.S.C. 154(b) by 0 days.

(21) Appl. No.: 13/579,365

(22) PCT Filed: Feb. 15, 2011

(86) PCT No.: PCT/FR2011/050321
§ 371 (c)(1),
(2), (4) Date: Sep. 27, 2012

(87) PCT Pub. No.: WO2011/101589
PCT Pub. Date: Aug. 25, 2011

(65) Prior Publication Data
US 2013/0008102 A1     Jan. 10, 2013

(30) Foreign Application Priority Data
Feb. 16, 2010  (FR) ...................................... 10 51094

(51) Int. Cl.
*E04D 13/18*  (2014.01)
*E04B 9/18*   (2006.01)
*E04D 13/00*  (2006.01)
*F24J 2/52*   (2006.01)

(52) U.S. Cl.
CPC .. *E04D 13/00* (2013.01); *F24J 2/52* (2013.01)
USPC ................ 52/173.3; 52/506.01; 52/506.06; 52/126.5

(58) Field of Classification Search
USPC .............. 52/173.3, 126.1, 126.5, 263, 302.1, 52/302.3, 506.01, 506.06
See application file for complete search history.

(56) References Cited

U.S. PATENT DOCUMENTS 4,438,610 A * 3/1984 Fifer ............................... 52/263
4,546,580 A    10/1985 Ueno et al.
(Continued)

FOREIGN PATENT DOCUMENTS

| DE | 200 06 328    | 7/2000 |
|----|---------------|--------|
| DE | 100 62 697    | 7/2002 |
| DE | 20 2004 005224 | 6/2004 |
| DE | 20 2005 015455 | 2/2007 |

(Continued)

OTHER PUBLICATIONS

International Search Report dated Jun. 8, 2011, corresponding to PCT/FR2011/050321.

*Primary Examiner* — Brian Glessner
*Assistant Examiner* — Patrick Maestri
(74) *Attorney, Agent, or Firm* — Young & Thompson

(57) ABSTRACT

A device for fixing elements in the form of plates to a roof cover for a building, at a distance therefrom, the cover including, on the surface, a coating or a sealing layer attached to the essentially continuous support forming the roof, the device including blocks that can be height-adjustable or not, for supporting and holding the plate-shaped elements, each block having a base with a lower smaller plate to be applied to the surface of the cover and secured thereto, and a head or upper part for directly or indirectly supporting at least one plate-shaped element, the bottom face of the smaller plate (9) of the base (8) of each block (7) being provided with a part (11) of the plate, forming a protector, which is mechanically fixed to the smaller plate (9).

24 Claims, 8 Drawing Sheets

(56) References Cited

U.S. PATENT DOCUMENTS

| | | | | |
|---|---|---|---|---|
| 4,558,544 | A | * | 12/1985 | Albrecht et al. ............ 52/126.6 |
| 8,424,255 | B2 | * | 4/2013 | Lenox et al. ................ 52/173.3 |
| 2004/0261329 | A1 | * | 12/2004 | Kugler et al. ............... 52/126.6 |
| 2009/0230265 | A1 | | 9/2009 | Newman et al. |
| 2011/0138703 | A1 | * | 6/2011 | Repasky ..................... 52/126.6 |

FOREIGN PATENT DOCUMENTS

| | | |
|---|---|---|
| DE | 10 2006 022870 | 9/2007 |
| DE | 10 2006 022455 | 11/2007 |
| DE | 20 2009 013142 | 12/2009 |
| FR | 2713687 | 6/1995 |
| GB | 2 378 457 | 2/2003 |

* cited by examiner

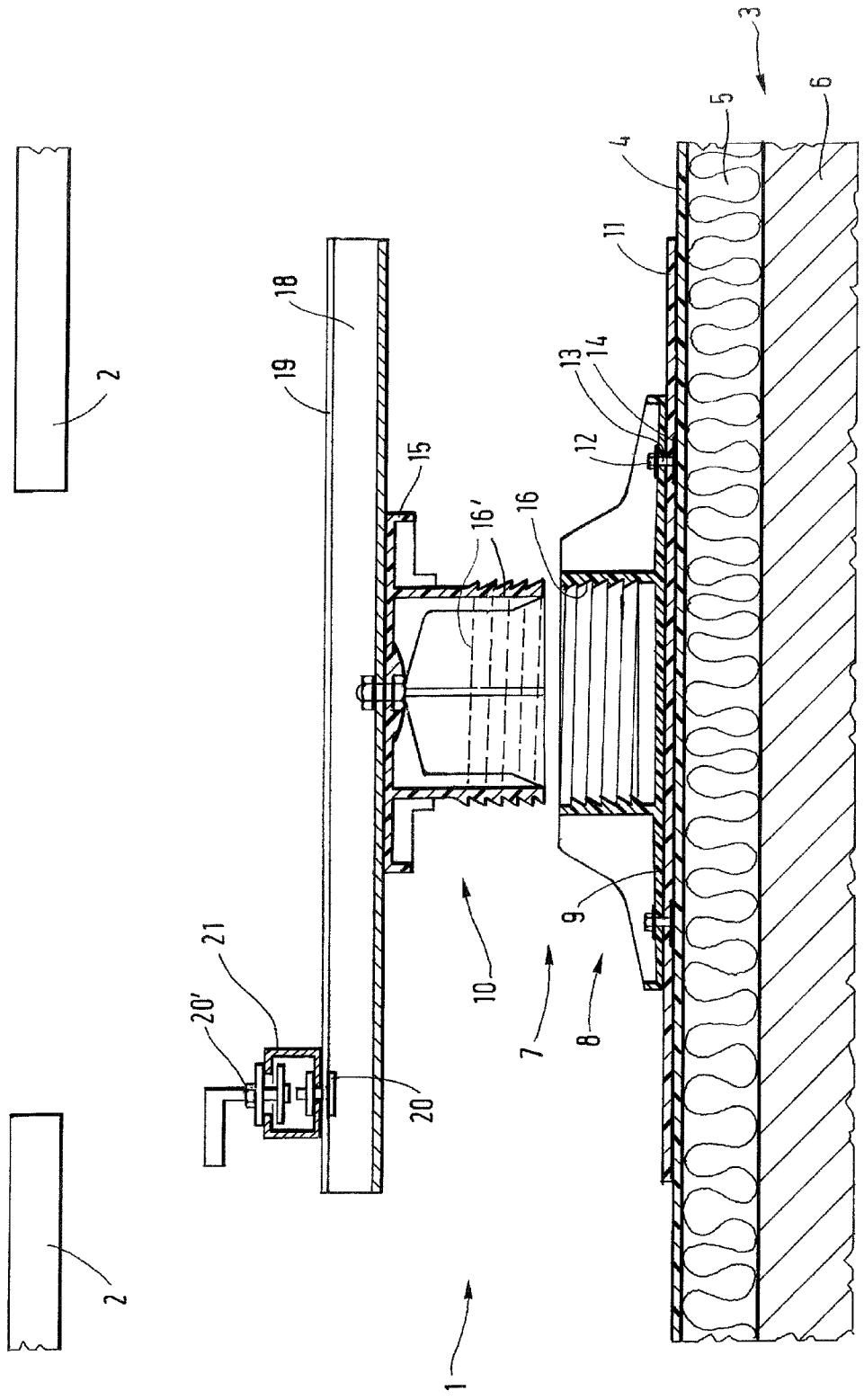

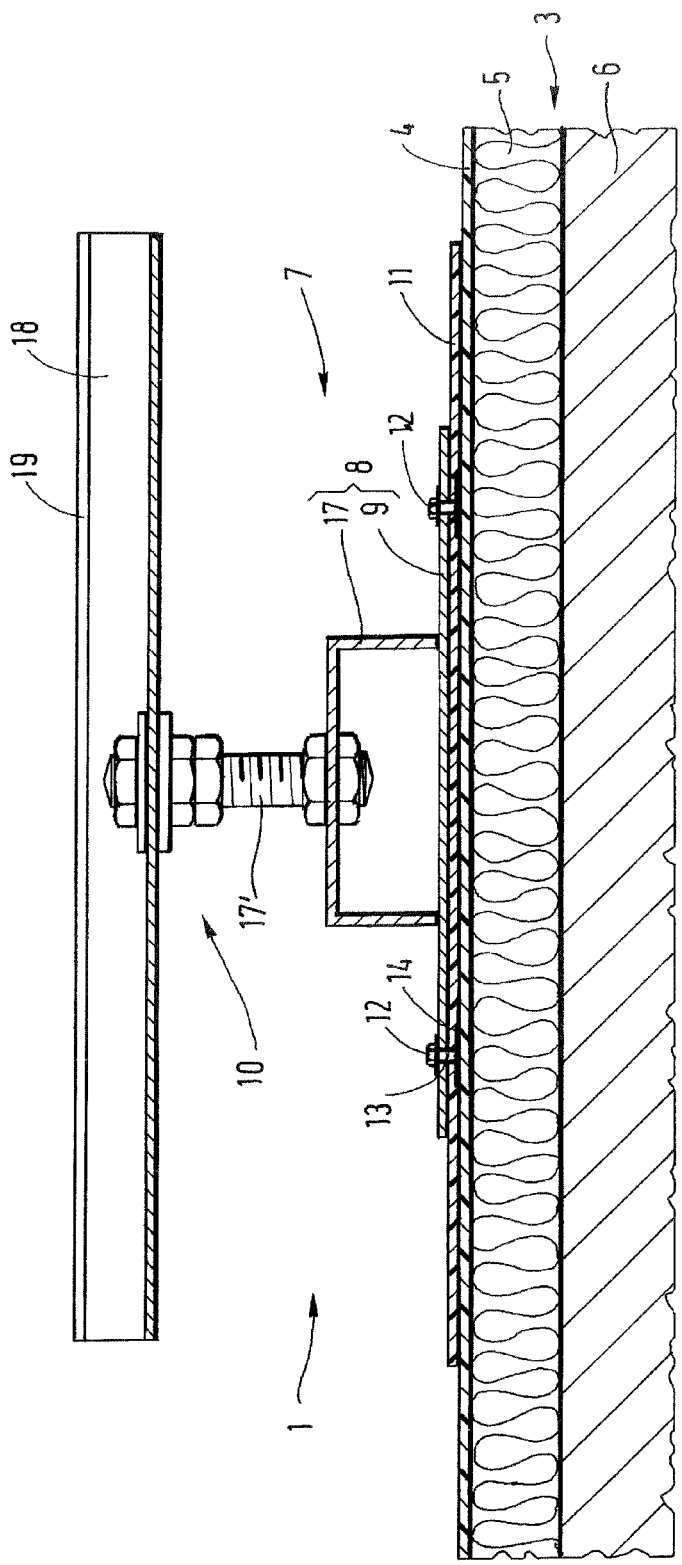

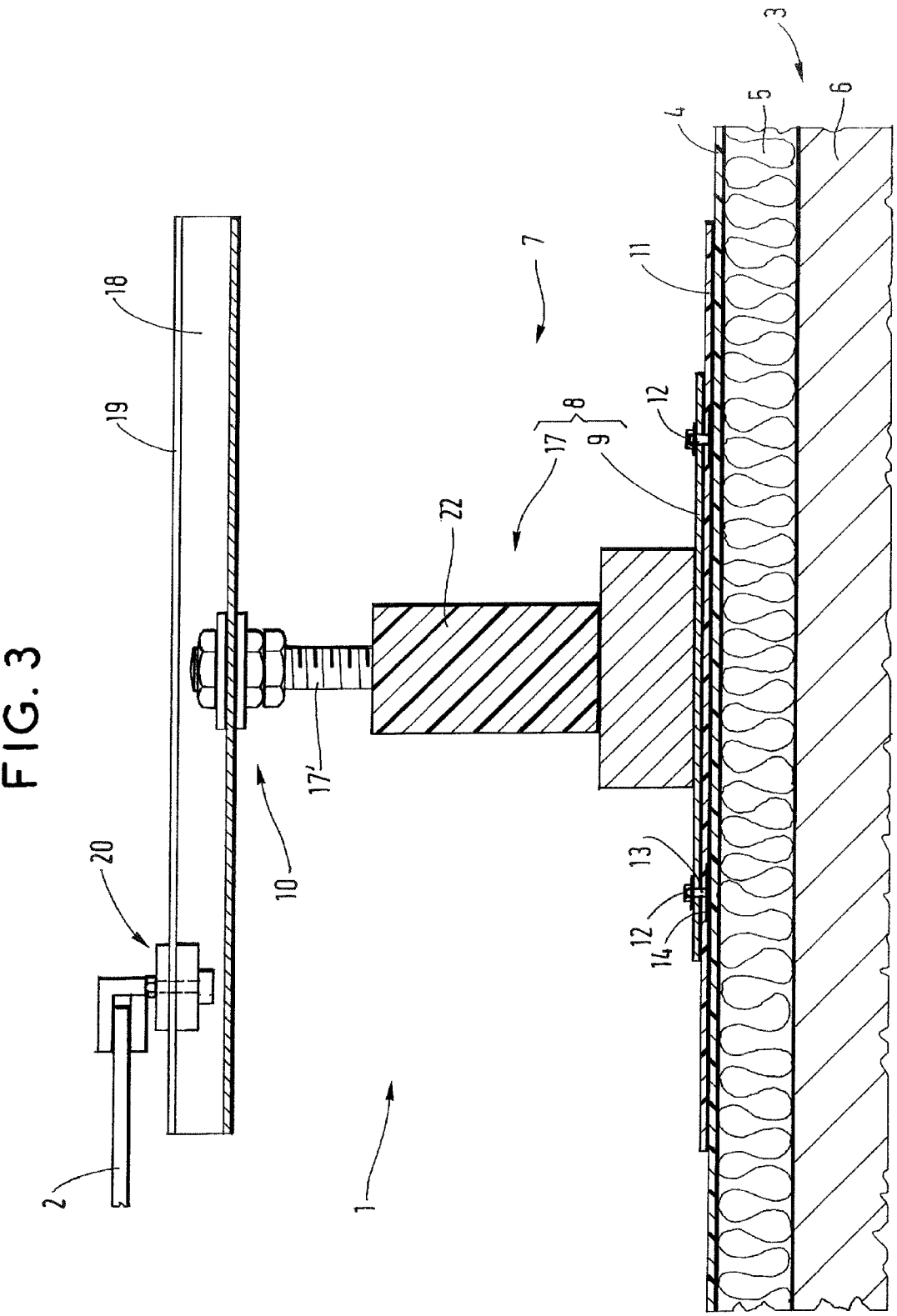

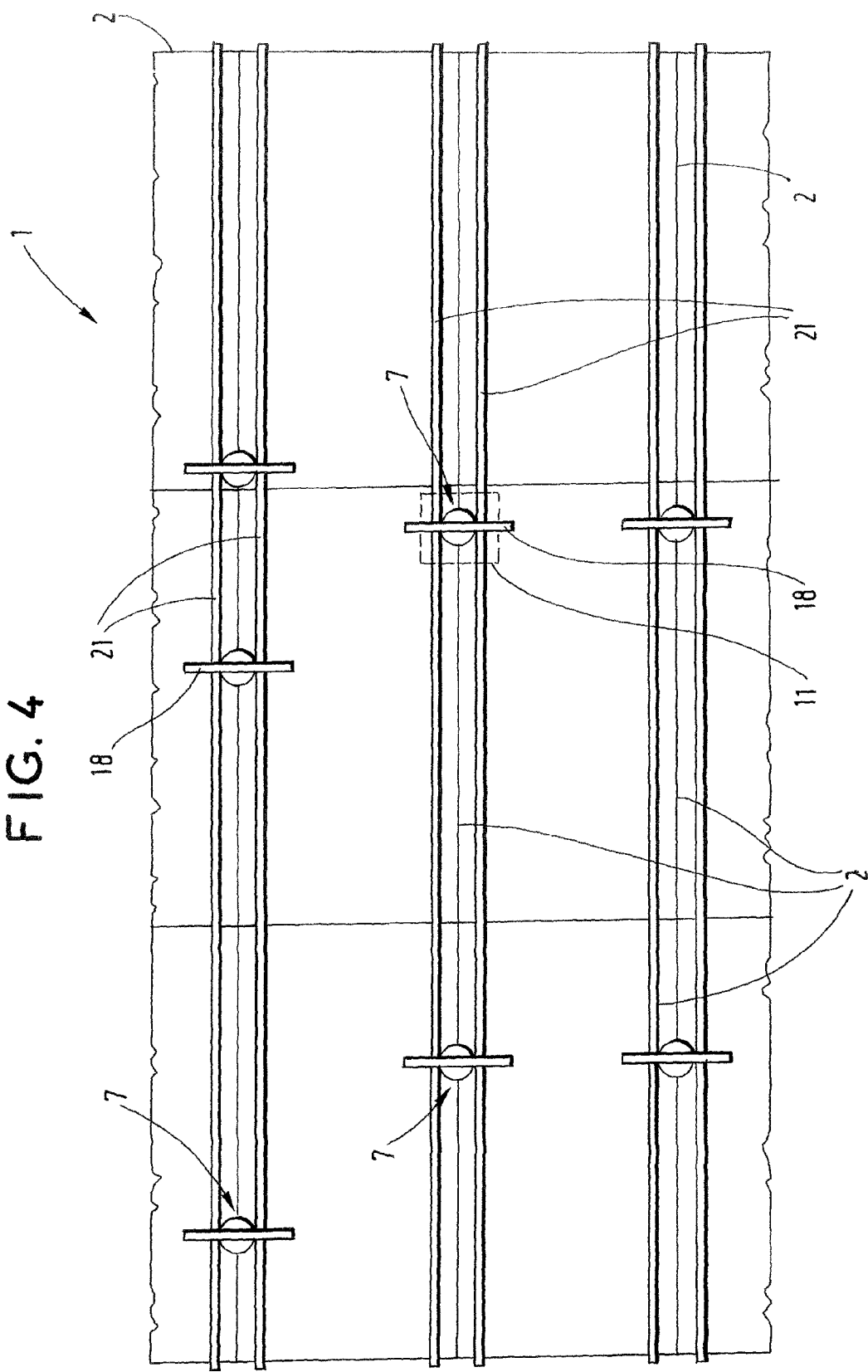

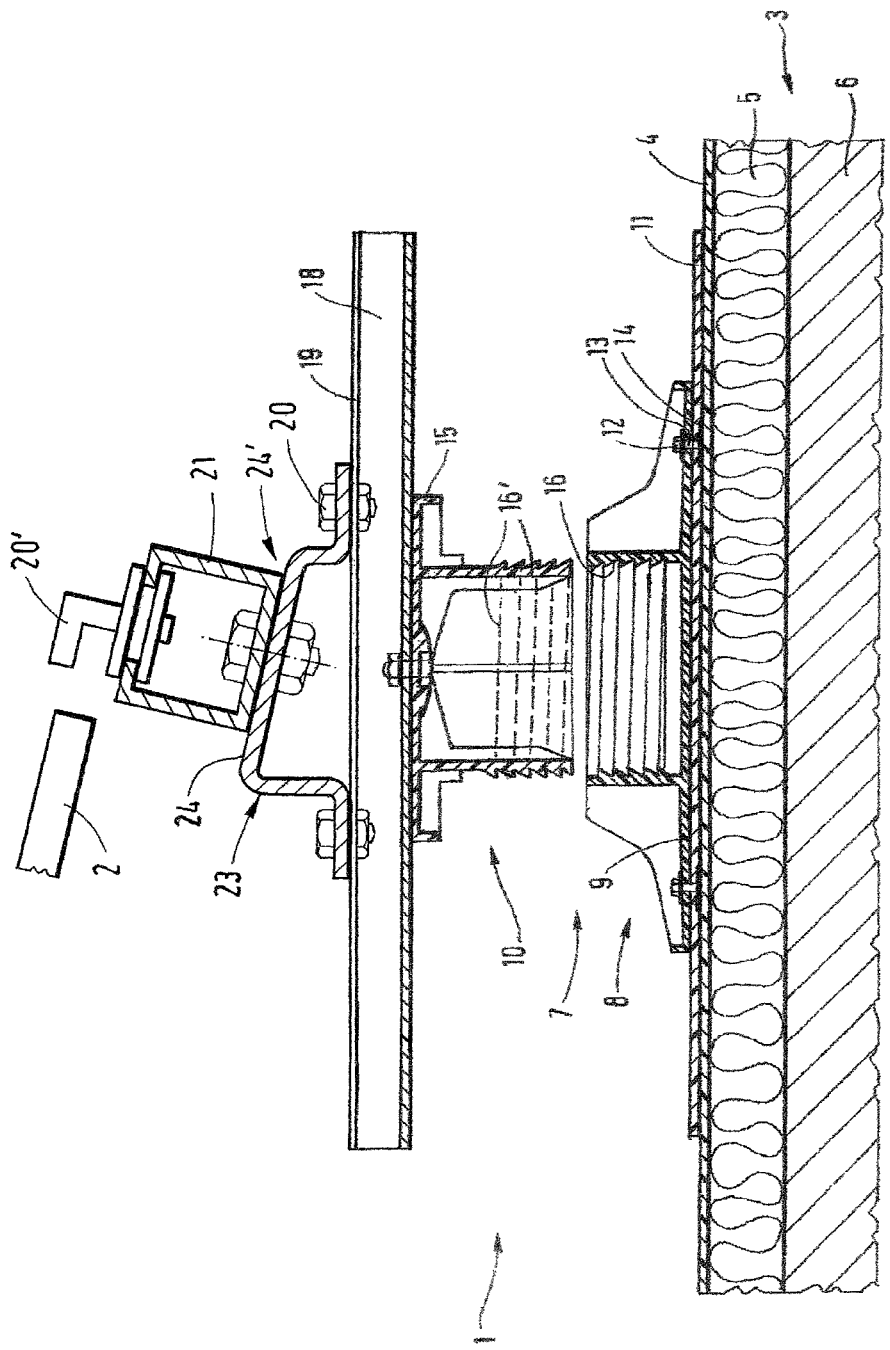

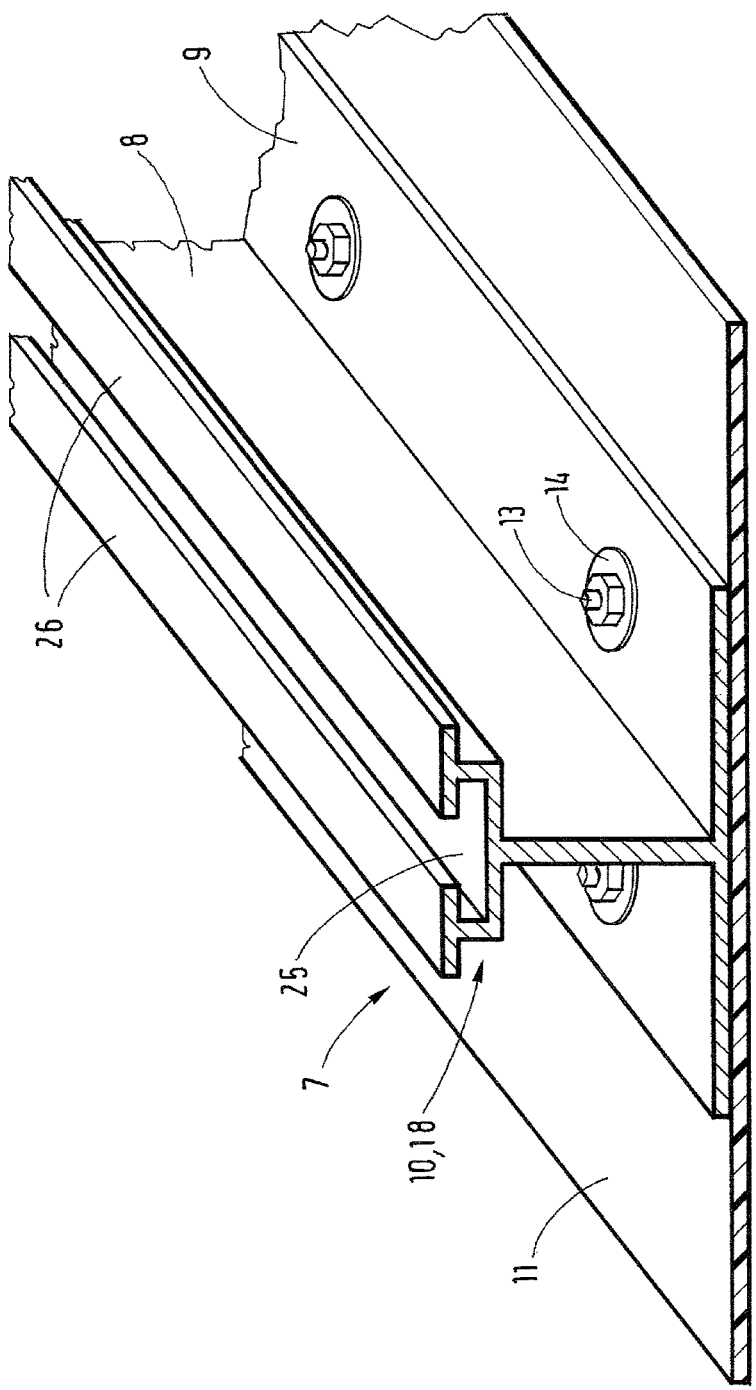

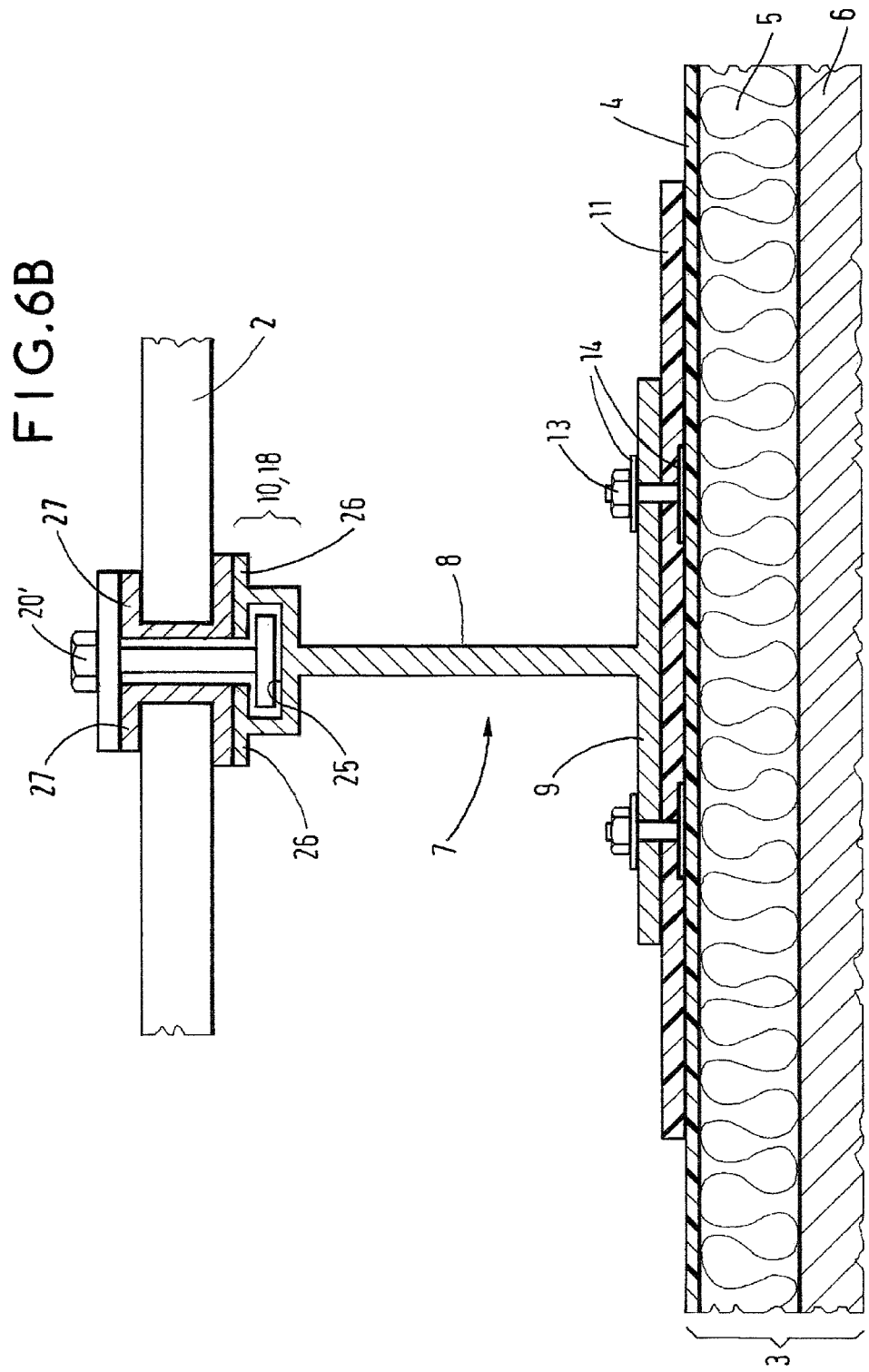

DEVICE FOR FIXING PLATES OR PANELS TO A COVER, AND RESULTING COMPOSITE COVER

This invention relates to the field of the roofing of buildings or covers of structures, more particularly the airtight covers that integrate one or more sealing coverings formed by membranes or flexible and partially deformable sheets, and has as its object a device for fixing elements in the form of plates, panels or the like on such covers of roofs.

The invention relates more specifically to the fixing of photovoltaic panels.

Numerous systems for mounting elements of plates, panels or the like on covers of roofs have already been proposed.

These known systems generally use elements for localized (or point) or profiled (or linear) bracing and support, making it possible to support the plates or panels with spacing from the roof cover in question.

Furthermore, different ways of fixing or connecting an airtight covering to its support is part of the state of the art and within the grasp of one skilled in the art. This support can consist of, for example, a thermal insulator, a slab of concrete, a cover made of wood or wood derivatives, a metal cover, etc.

In general, the airtight coverings are connected to the support (by thermal or adhesive bonding, by semi-bonding, by mechanical attachment) directly at the load-bearing element or the framework, or more generally with interposition of a thermal insulator between the load-bearing element and said sealing covering. This connection makes it possible in particular for the sealing, which forms the exposed layer, to withstand the effects of partial vacuum and the detachment stresses created by the wind.

When no particular connecting of the covering with its support, or directly with the load-bearing element, is provided, it is said to be placed independently. In this case, ballasting is necessary to prevent it from detaching from the roofing and flying off, where this ballasting comes in the form of, for example, grit, slabs, small slabs or other massive cover elements, also depending on whether or not the roofing in question is accessible.

This invention relates more particularly to the roofing systems in which elements of plates, panels or the like that have inadequate weight for withstanding the action of the wind are installed on a sealing covering that is connected to its support, whereby said covering consequently has to contribute to the wind resistance of the connected panels or plates.

One objective of the invention is to prevent piercing, disrupting or creating any discontinuity whatsoever in the sealing covering, which would be caused by, for example, through mechanical attachments that are anchored directly in the load-bearing element or the framework or by installing bollards or support studs fixed on this load-bearing element or on the framework.

By the document U.S. Pat. No. 4,546,580, a roof structure that comprises studs that support light panels by holding them and that rest on a sealing covering to which they are connected by bonding of their small plate is already known.

However, this known system necessarily requires the use of a specific bonding agent, and, taking into account the limited surface area of the small plate of the base of this stud, the bonding surface is of necessity limited, which leads to localizing stresses at the sealing covering in the event of a wind gust and a total limitation of the adhesion force.

In addition, with the stud (generally made of metal or hard plastic) and the sealing covering (generally a membrane or a synthetic or bituminous layer) being made of different materials, their behavior facing temperature variations can be very different and can thus generate local stresses that may end in a detachment of the stud or a rupture of the sealing covering.

Finally, because of the significant weight that may be supported by each stud, high shear stresses may be exerted by the edge of the small plate of the stud on the subjacent zones of the sealing covering, which may lead to a rupture of the latter.

In the document FR 2 713 687, quasi-point supports for sub-roofing elements, which can be bonded on a sealing covering, are mentioned.

In addition to the drawbacks already mentioned in connection to the US document above, these supports have additional drawbacks of not being adjustable in height and each supporting only a single roof-superstructure element.

Finally, the document DE-A-10 2006 022 455 discloses a device for fixing elements in the form of plates or panels on the airtight upper layer of a roof. This device essentially comprises individual studs with adjustable height that are each formed, on the one hand, by a base with a small lower plate that is designed to rest on the upper layer of the roof and to be made integral with the latter, and, on the other hand, a head that is designed to support one or more element(s) in the form of (a) plate(s).

Each base is made of a single piece of a thermoplastic material and comprises a hard core and a lower part or a soft base, from which there results a particular manufacturing system and the necessity for fixing by bonding on the airtight layer when it is desired to prevent the latter from being pierced.

This invention has as its object to remedy at least some of the drawbacks that are presented.

For this purpose, it has as its object a device for fixing elements in the form of plates, panels, or the like, on a building roof cover, with spacing from the latter, with said cover comprising at the surface a covering or a sealing layer that is connected to the essentially continuous support that forms the roof, on a layer or a sealing covering that is subjacent or on a thermal insulation layer that covers this support, with this device comprising studs for support and holding at a height that may or may not be adjustable for the elements in the form of plates, panels, or the like, each of these studs having a base with a small lower plate that is designed to rest on the surface of the cover and to be made integral with the latter, and a head or an upper portion that is designed to support directly or indirectly one or more elements in the form of plates, panels or the like, device characterized in that the small plate of the base of at least certain studs, preferably each stud, is equipped on the underside with a part of a plate, panel, membrane or connected sheet forming a protector, whose surface area is preferably larger than that of the small plate, in that each protector is made of a material that is compatible with and/or of the same nature as the layer or the surface covering of the cover and is able to be linked to this layer or this covering by an adhesive connection, and in that each protector is fixed mechanically to the small plate of the base of the corresponding stud, with the material of the protector advantageously having a significant deformation and tear resistance.

The invention also relates to studs that are used in such an attachment device, with the bodies of said studs able to be made of either two parts assembled together and mutually cooperating or a single piece optionally with an elongated or profiled structure in a given direction.

Finally, the invention also relates to a roofing system that uses an attachment device of the above-mentioned type, the latter optionally able to comprise studs of two types, namely with a one-piece body or with two components that are assembled by mounting.

The invention will be better understood owing to the description below, which relates to preferred embodiments, provided by way of nonlimiting examples and explained with reference to the accompanying diagrammatic drawings, in which:

FIG. 1 is a partial exploded view, in lateral elevation and in cutaway, of an attachment device according to a first embodiment of the invention that is mounted on an airtight cover;

FIG. 2 is a partial view in lateral elevation and in cutaway of an attachment device according to a second embodiment of the invention that is mounted on an airtight cover;

FIG. 3 is a partial view in lateral elevation and in cutaway of an attachment device according to a variant of the second embodiment that is mounted on an airtight cover;

FIG. 4 is a partial top transparency view of a portion of an example of a roofing system according to the invention that illustrates the structure of the attachment device, with use of studs according to any of the variants of FIGS. 1 to 3;

FIGS. 5A and 5B are similar to those of FIGS. 1 to 3, showing two other variants, which are compatible with one another, for the embodiment of a stud that is part of an attachment device according to the invention;

FIG. 6A is a partial perspective view of a stud according to another embodiment of the invention, and FIG. 6B is a partial cutaway view, through a stud, of an attachment device that uses a stud as shown in FIG. 6A.

Figure 5B:
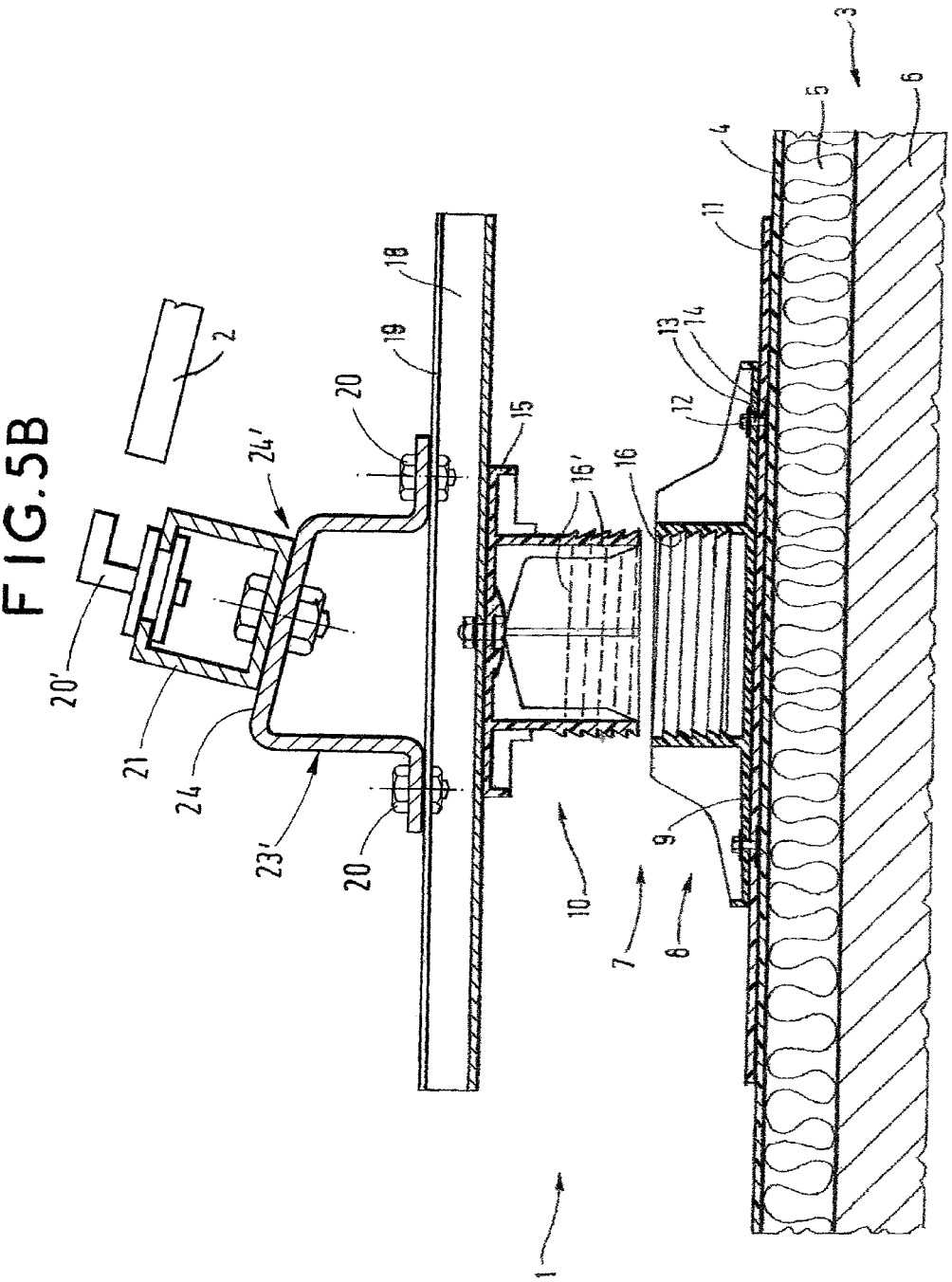

FIGS. 1 to 4, 5A, 5B and 6B of the accompanying drawings partially show a device 1 for fixing elements 2 in the form of plates, panels or the like on a cover 3 of a building roof, with spacing from the latter.

On the surface, this cover 3 comprises a covering or an airtight layer 4 that is connected to the essentially continuous support 6 that forms the roof, on a subjacent layer or sealing covering or on a thermal insulation layer 5 that covers this support 6 (structural variant shown in FIGS. 1, 2 and 6B).

The attachment device 1 comprises studs 7 for support and holding at adjustable height for the elements 2 in the form of plates, panels or the like, each of these studs 7 having a base 8 with a small lower plate 9 that is designed to rest on the surface of the cover 3 and to be made integral with the latter and a head or upper portion 10 that is designed to support directly or indirectly one or more elements 2 in the form of plates, panels or the like (lower plate 9 for support and engagement).

The studs 7, or at least some of the studs 7, can optionally be non-adjustable in height.

In accordance with the invention, the small plate 9 of the base 8 of at least some studs 7, preferably each stud 7, is equipped on the underside with a part 11 of a plate, panel, membrane or connected sheet that forms a protector and whose surface area is preferably larger than that of the small plate 9. This protector 11 consists of a material that is compatible with and/or of the same nature as the layer or the surface covering 4 of the cover 3 and is connected to this layer or to this covering 4 by an adhesive connection.

The use of such a connecting protector 11, inserted after the stud 7 is mounted between the small plate 9 of the base 8 of the latter and the sealing layer or covering 4, makes it possible, on the one hand, to obtain a very resistant connection with a distribution of tensile stresses on a large area of the layer or covering 4, and, on the other hand, to limit the shear or cutaway stresses exerted at the edge of the small plate 9 on said layer or said covering (damping cushion function of the protector 11).

In addition, taking into account the nature of the material that forms this protector 11, its temperature behavior (in particular in terms of contraction and expansion) will be similar, and even identical, to that of the layer or the covering 4, preventing the generation of stresses at the contact interface between these two components.

Although other connection types can be considered, each protector 11 is preferably fixed mechanically to the small plate 9 of the base 8 of the corresponding stud 7, and its constituent material has a significant deformation and tear resistance.

Thus, there is no compatibility problem of materials between the small plate and the protector.

Based in particular on the nature of the layer 4 of the targeted application and/or desired performances, protectors 11 of varied type, nature and dimensions can be combined with the same type of studs 7.

In accordance with the invention, the studs 7 may (FIGS. 1 to 5) or may not (FIG. 6) be of adjustable height, have an integral body 8, 10 (FIG. 6) or be of two cooperating parts (FIGS. 1 to 5) or else provide either a localized anchoring and support point (relatively point-like), or a linear extension support.

In the latter case, the upper portion or head 10 at least of studs 7 has a larger extension in one direction, preferably a profiled composition (FIGS. 2 and 6A).

According to a first practical variant embodiment, shown in the accompanying drawings, mechanical attachment is done at several points 12, preferably distributed over the periphery or along the small plate 9 of the base 8 of the stud 7, with each point 12 comprising a mechanical attachment element 13 that passes through the protector 11 and is combined with a plate or a washer 14 that is designed to press said protector 11 locally against said small plate 9.

According to a second practical variant embodiment, not shown in the accompanying drawings, mechanical attachment is done by pinching, on the one hand, at least the protector 11 between the small plate 9 of the base 8 of the stud 7 and a counter-plate that is connected to said small plate 9 by attachment elements that pass through said protector 11.

The surface adhesive connection between the protector 11 and the layer or surface covering 4 of the cover 3 can be produced according to different techniques that are known to one skilled in the art, if necessary based on the nature and the type of materials that constitute the protector 11 and the layer or covering 4.

In accordance with the invention, the protector 11 is made of a material that is capable of forming and designed to form a surface adhesive connection with the layer or the surface covering of the cover, whereby said connection is of the type that is selected from the group that is formed by the connections by bonding with a related bonding agent, the cold adhesion connections and the welding connections, whereby said adhesive surface connection is provided to extend preferably essentially over the entire surface of the protector.

Thus, this surface adhesive connection can consist of, for example:

A bonding connection, with the bonding agent being a related additional agent, and A cold adhesion connection, the underside of the protector 11 that comprises a covering that has suitable properties (for example, self-adhesive underside).

However, in accordance with a very advantageous variant embodiment of the invention, preventing the use of an additional bonding agent or a particular underside covering of the protector 11, the surface adhesive connection between the latter and the layer or the surface covering 4 of the cover 3 is a welding connection (for example with the flame of a blowtorch or with hot air), with the protector 11 and the layer or surface covering 4 then preferably being based on a bituminous or synthetic sealing membrane.

For the purpose of obtaining a value of maximum adhesive force, the surface adhesive connection between the protector 11 and the layer or surface covering 4 of the cover 3 essentially extends over the entire surface of the underside of the protector 11 (the plates or washers 14 or the counter-plate mentioned above corresponding to zones that may or may not be adhesive to the layer or the covering 4).

Although a surface area of the protector 11 that is larger than that of the small plate 9 makes it possible to achieve higher adhesion performances, it is also possible to consider equal surface areas, and even a smaller surface area for the protector 11, in particular when the desired performances are more limited and/or when the nature of the connection provides adequate performances.

With no sealing function being specifically desired, said adhesive connection can be either of a continuous nature at the underside of the protector 11 or of a discontinuous nature with the creation of radial or peripheral unconnected zones.

By way of nonlimiting examples of the types of sealing coverings, it is possible to cite, on the one hand, those of modified bitumen, preferably without self-protection, making possible a quick connecting of the protector 11 and, on the other hand, those in the form of flexible or rigid, synthetic resin-based membranes (naturally without self-protection).

The sealing covering 4 advantageously can be a bituminous double layer, which corresponds to a solution with very high reliability and durability, resting directly on the support 6 or generally on a thermal insulation layer 5.

By way of practical example of a sealing covering, it is possible to mention a standard system that consists of two SBS-modified bitumen sheets, with the first layer 2.5 mm thick being reinforced by a non-woven glass fabric of 50 $g/m^2$, and with the second layer also being 2.5 mm thick and also reinforced by a glass fabric of 50 $g/m^2$.

A highly reinforced system that is cited as an example can consist of two SBS-modified bitumen sheets, the first sheet 2.5 mm thick being reinforced by a polyester-glass composite of 130 $g/m^2$ and the second layer 3.5 mm thick being reinforced by a polyester-glass composite of 250 $g/m^2$.

Among the techniques that are known to one skilled in the art, the sealing covering is connected to its support at least in semi-independence and preferably by adhesion.

The most common example of a semi-independent installation method is the one by mechanical attachment that is directly linked to the load-bearing element or the support 6.

As indicated above, a double-layer system should be preferred. The sheets of the first layer are then assembled according to the description that is developed in, for example, the Technical Notice 5/06-1903 by being placed freely on their support that is in general an insulating panel 10 cm thick, for example, and then their covers that are several centimeters wide and including the through mechanical attachment are welded so as to make them airtight. The sheets of the second layer are next welded fully on those of the first layer.

As already indicated above, there is generally virtually always insulation under the sealing cover.

The particularly suitable insulation within the framework of the invention as sealing support as well as connected rigid panel elements 2 are of class C in resistance to the compression according to the UEATC guide.

This category of panels is conventionally used in the case of roofing with slabs or studs for terraces that are accessible to the public. The resistance to the compression of the insulation is actually a significant practical parameter, in particular in connection with the high mechanical stresses generated on the site during the use of panels 2 on the attachment device 1.

Furthermore, it is understood that any insulating panel that can accommodate, in full adhesion or semi-adhesion, a sealing covering experiences its own performance relative to the wind, as a function in particular of its inside cohesion. This ability is generally deduced from its tensile strength perpendicular to the two surfaces of the insulating panel.

The protectors 11 that can be used within the framework of the invention can be of different types and of different natures of materials.

Thus, according to a first practical variant, the protector 11 can consist of a sheet or bituminous membrane portion (for example of the 40 cm×40 cm size) with either an upper surface that is self-protected by slate flakes or an upper surface of SEBS-modified bitumen that is UV-resistant.

The sheet that is self-protected by flakes, defined in its CSTB Technical Notice No. 5/08-1993, is a membrane 4 mm thick that is based on bitumen that is modified by the SBS elastomer, reinforced by a non-woven polyester substrate of 250 $g/m^2$ with strong mechanical tensile strength (on the order of 1,000 N/5 cm according to EN 12311-1) and a significant tear resistance on a nail (on the order of 300 N according to EN 12310-1).

The sheet with an SEBS-modified bitumen surface, defined in its CSTB Technical Notice No. 21/09-06, is a membrane 3.5 mm thick, reinforced by a 250 g/m2 polyester-glass composite substrate with a tensile strength of 1,500 N/5 cm and a tear resistance of approximately 250 N.

The bituminous sheet can also be based on PPA (atactic polypropylene)-modified bitumen with an upper surface without self-protection.

According to a second practical variant, the protector 11 can consist of a portion of flexible synthetic membrane of the type TPO (thermoplastic polyolefins) or PVC (polyvinyl chloride), for example 30 cm×30 cm.

These two synthetic membranes, for example 1.5 mm thick, can be reinforced by a polyester grid of 110 $g/m^2$ with high tensile strength (of at least 1,000 N/5 cm according to EN 12311-2) and with a very high tear resistance (250 N according to EN 12310-2).

According to a third practical variant, the protector 11 can consist of a plate or a rigid synthetic membrane (for example, 20 cm×20 cm) based on, for example, PE HD (high-density polyethylene). Such a synthetic membrane has an adequate mechanical tensile strength and an adequate tear resistance without this membrane being reinforced.

Finally, it can also be considered to use a protector 11 with two components (stratified structure), with the upper component being compatible with the small plate and the lower component being compatible with the sealing wall.

The composition of the studs 7 can be varied, one-piece, or allowing at least a possible adjustment of its height, provided that it makes it possible for said studs 7 to withstand tensile and compression stresses resulting from the application according to the invention.

Thus, the studs 7 can be made of plastic or metal materials, can be hollow or solid, can be formed integrally with the small lower plate 9, or can consist of several parts that are assembled with one another in such a manner that they may or may not be removable.

These bodies 8 and 10 can be, at least for one, of a massive nature, but preferably they both come in the form of a hollow, advantageously cylindrical, body.

In accordance with a first advantageous, nonlimiting embodiment, of which a possible structure variant is shown diagrammatically in FIG. 1 of the accompanying drawings, each stud 7 consists of two bodies 8, 10, preferably made of a synthetic material and corresponding respectively to the base 8 and the head 10, of which each is equipped with a small plate 9, 15, the two bodies 8, 10 comprising screwing ramps 16, 16' that work together and that carry out the assembly of said bodies 8, 10 and that make it possible to adjust the distance between the small upper plate 15 that equips the head 10 and the small lower plate 9 that equips the base 8.

In accordance with a second advantageous, nonlimiting embodiment, shown diagrammatically in FIG. 2 of the accompanying drawings, each stud 7 consists of, on the one hand, a base 8 that is formed by a small plate 9 that is extended by or that carries an intermediate connecting body 17, and, on the other hand, a head 10 that is formed by a threaded rod 17' or a projecting attachment element or analogous mechanical connection and an elongated or surface support element 18 that is connected rigidly to said rod 17' or the like, which itself is connected rigidly to the intermediate connecting body 17, the connection [support element 18/threaded rod or the like 17'] and/or the connection [threaded rod or the like 17'/intermediate connecting body 17] allowing a height adjustment of the stud 7 that is being considered, with a possibility of locking in position.

The threaded rod 17' can, for example, be fixed to the wall of the connecting body 17 by a nut/locknut system (FIG. 2), and the element or the elongated or profiled support body 18 can be made rigidly integral with the upper end of this rod 17' by a similar fixing system, with optional interposition of washers (FIG. 2).

In accordance with a variant of the second embodiment, shown in FIG. 3, it may be provided that at least some of the studs 7 comprise a means 22 for damping and/or absorption of shocks and vibrations, for example, in the form of a block cylinder made of an elastomer material, at the base 8, at the head 10, or else between these two constituent parts of the stud 7 that is being considered.

The means 22 can be integrated into the base 8 (FIG. 3) or else can be integrated into the threaded rod 17' (comprising two threaded ends on either side of the damping block 22).

In accordance with a third embodiment of the invention, shown in FIGS. 6A and 6B of the drawings, each stud 7 can, as a variant, comprise a body 8, 10 having a one-piece structure, with the base 8 and the head 10 being formed by a single piece, base 8 comprising, for example, in addition to the small plate 9, a vertical wall that connects the latter to the head 10.

Advantageously, the body 8, 10 can consist of a metal profiled segment, with the head 10 forming a rail with a central longitudinal groove 25 that can accommodate hooking means 20, 20' and with two side wings 26 that are located on either side of the groove 25, forming longitudinal support strips.

According to an advantageous characteristic of the invention, the head or the upper portion 10 of each stud 7 integrates or is integral with an elongated or profiled support body 18, such as, for example, a rail that extends essentially parallel to the small plate 9 of the base 8 of the stud 7 that is being considered, with said elongated or profiled support element 18 comprising individual or continuous anchoring sites 19 for hooking means 20, either directly elements 2 in the form of plates, panels or the like, or second support elements or profiled rails 21 that carry and hold these elements 2, for example by means of second hooking means 20' or else intermediate mounting parts 23, 23' for these second profiled support elements 21 (FIGS. 1 to 3 and 5A and 5B).

Such a structure makes it possible to use a number of support points for the elements 2, allowing each stud to participate in the support of several elements 2, even when the latter are separated from one another and are optionally of different types (i.e., according to several of the variants of FIGS. 1 to 6). In addition, the relative positioning of studs 7/elements 2 can be modified and adjusted, which facilitates the installation of said studs 7 on site (the precision of installation that can be reduced).

The attachment of the profiled support body 18 on the small upper plate 15 of the stud 7 of FIG. 1 can be carried out, for example, by means of an insert that may or may not be threaded, cast by the material of the small plate and designed to accommodate a mechanical attachment element.

It should be noted that said elements 2 can, as a variant, also rest directly on the small plate 15 within the framework of the first variant embodiment of the studs 7.

The latter can, for example, in terms of structure, essentially correspond to the studs that are described and shown in the documents EP 0 259 237 and FR 2 638 477 in the name of the applicant.

The element or the support body 18 can be adjustable in its position or its angular orientation around the head 10 (threaded rod 17 or small upper plate 15) and optionally also in its longitudinal direction by provision of an elongated attachment site within the body or element 18 (oblong hole, for example).

As is partially evident from FIG. 1, the elongated or profiled support bodies 18 of the studs 7 can form with the second profiled support elements 21 a two-dimensional framing of support and attachment of the elements 2 in the form of plates, panels or the like.

Such a framing makes it possible to distribute optimally the weight of the unit of the elements 2 at the studs 7 and to impart structural cohesion to the studs 7/elements 2 unit.

Furthermore, the height-adjustment capability of the studs 7 makes it possible to adjust the slope or to adjust the parallelism between the elements 2 and the cover 3, as well as optionally to compensate for local deformation of this cover 2.

In accordance with an additional variant of the invention, shown in FIGS. 5A and 5B of the drawings, the mounting parts 23, 23' consist of intermediate fastenings of at least two different sizes, with each fastening 23, 23' having lower hooking feet 20, designed to be fixed in the anchoring sites 19 of the support body 18 and an upper portion 24 with an inclined mounting site 24' for the second support elements or profiled rails 21 that are designed to carry the elements 2 and to hold them by using second hooking means 20', with the fastenings 23 and 23' of the two sizes being arranged according to a network in a pair of fastenings of different sizes and in alignments of fastenings of the same size in such a way as to allow their respective inclined mounting sites to be located in the same inclined plane.

Thus, the second support elements or profiled rails 21, which rest according to arrangements that are parallel to coinciding alignments of studs 7 equipped with bottom fastenings 23 or top fastenings 23', are inclined relative to the support planes of the bases 8 of the studs 7.

As a result, the elements in the form of plates or the like can be placed above a cover 3 by being inclined relative to the latter, by fixing them on two opposite sides using means 20' for hooking to profiled support elements 21 that run under the opposite two sides. The elements 21 are themselves assembled with studs 7 by means of top fastenings 23' on one side of each element 2 in the form of a plate and by means of bottom fastenings 23 on the other side of each element 2 in plate form.

This assembly mode of elements in the form of plate 2 makes it possible to promote a flow of water over these elements 2 without creating mechanical stresses in these elements 2 or in the second profiled support elements 21, while remaining with a little spacing from the cover 3.

In connection with FIGS. 1 to 5, the attachment points of the elements 2 in the form of plates, panels or the like can be adjustable within the three dimensions, with a possibility of two-dimensional adjustment in a plane that is parallel to the plane of the cover 3 owing to the framing formed by the profiled support elements 18 of the studs 7, the second profiled elements 21, and the sliding hooking means 20, and with a possibility of adjustment in a direction that is essentially perpendicular to the plane of the cover 3 owing to the studs 7.

In the embodiment that is shown in FIGS. 6A and 6B, the mechanical attachment of the protector 11 with the small plate 9 can be done as described above in connection with the embodiments of FIGS. 1 to 5. Likewise, supports 18 and above-mentioned intermediate mounting parts 23, 23' can optionally be used.

The attachment of elements 2 to the studs 7 of FIGS. 6A and 6B can be done either directly by means of hooking means 20 in a suitable form (pinching of elements on their lateral edges) and in combination with blocks 27 (FIG. 6B), or indirectly by means of second hooking means 20' combined with second support elements 21, or else by means of inclined mounting parts 23, 23' (not shown).

The invention also has as its object a roofing system with two integrated components comprising a lower airtight cover 3 with a covering or a surface sealing layer 4, preferably a synthetic or bituminous sealing membrane, and an upper layer that consists of elements 2 in the form of plates, panels or the like, located with spacing from the lower airtight cover 3.

This system is characterized in that the elements 2 of the upper layer are carried and held on the cover 3 by an attachment device 1 that has one or more of the characteristics mentioned above, if necessary by comprising studs 7 of different types according to the variant embodiments described above.

In a preferred, but nonlimiting manner, the airtight cover 3 has, on the surface, a bituminous sealing membrane 4, optionally forming part of a sealing complex with two superposed layers, and the elements 2 of the upper layer consist of photovoltaic panels.

The implementation of the invention, in connection with the installation of photovoltaic panels 2 on an airtight cover 3, can comprise, for example, the following primary stages:

Spotting and marking of the position of the studs 7 on the cover 3 based on a plane;

Fixing the studs 7 with their protector 11 to marked sites, by welding or the like;

Optionally verifying the good assembly of studs 7 with their respective protectors 11;

Installing longitudinal rails 21 that directly support the panels 2 on the element or the elongated body 18 as indicated on the fastening plane;

Adjusting, if necessary, the height of the studs 7 to obtain a load-bearing contact between the framing and each stud 7;

Assembling the components of the framing (rails 21 on the element 18);

Installing, on the rails 21, intermediate protective parts designed to support the panels 2 (with or without a frame);

Equipping the panels 2 with hooking means 20' that are designed to work with the rails 21 during the placing of panels 2;

Positioning the panels 2 with locking in position on the rails 21.

Finally, the invention also relates to a stud 7 for support and attachment designed to be part of an attachment device 1 as described above.

This stud 7, evident from FIGS. 1 and 2, comprises, on the one hand, a base 8 with a small lower plate 9 that is designed to rest on and to be made integral with a layer or a sealing covering 4 that forms the surface component of a roof cover 3 and, on the other hand, a head or upper portion 10 that is designed to support one or more elements 2 directly or indirectly in the form of plates, panels, or the like.

This stud 7 is primarily characterized in that the small plate 9 of the base 8 is equipped on the underside with a part 11 of a plate, panel, sheet or connected membrane that forms a protector, whose size or surface area is preferably larger than that of the small plate 9. This protector 11 consists of a material that is compatible with and/or of the same nature as the layer or surface covering 4 of the cover 3 in question and can be linked to this layer or to this covering 4 by an adhesive connection.

In addition, said protector is mechanically attached to the small plate 9 of the base 8, with the material of said protector 11 advantageously having a significant deformation and/or tear resistance.

FIGS. 1 to 3, 5 and 6 illustrate different embodiments of such a stud 7.

As indicated above, and for each stud 7, the base 8 and the head 10 can either form two separate parts that are assembled with one another to constitute the body of said stud 7, whose height is adjustable, or can be made integrally and form together the one-piece body of the stud 7, whereby this body then preferably exhibits a profiled composition.

These different types of studs 7 optionally can be put together in an attachment device according to the invention.

Of course, the invention is not limited to the embodiments that are described and shown in the accompanying drawings. Modifications are possible, in particular from the standpoint of the composition of the various elements or by substitution of equivalent techniques, without thereby exceeding the scope of protection of the invention.

The invention claimed is:

1. A device for fixing elements in the form of plates or panels on a building roof cover with spacing from the cover, the cover comprising, at a surface thereof, a covering or a sealing layer that is connected to an essentially continuous support that forms the roof, on a layer or a sealing covering that is subjacent, or on a thermal insulation layer that covers the support, the device comprising:

studs for support and holding at an adjustable height for the elements in the form of plates or panels, each of the studs having a base with a small lower plate that is designed to rest on the surface of the cover and to be made integral with the cover, and a head or an upper portion configured to support directly or indirectly one or more elements in the form of plates or panels, wherein:

the small plate of the base of at least a plurality of studs is equipped on the underside with a part of a plate, panel, membrane or connected sheet forming a protector, whose surface area is at least as large as that of the small plate, each protector is configured to be linked to this layer or this covering by an adhesive connection, and each protector is fixed mechanically to the small plate of the base of the corresponding stud.

2. The device according to claim 1, wherein the mechanical attachment is made at several points, distributed over the periphery or along the small plate of the base of the stud, each point comprising a mechanical attachment element that goes through the protector and is combined with a plate or a washer that is configured to press said protector locally against said small plate.

3. The device according to claim 1, wherein the mechanical attachment is made by pinching at least the protector between the small plate of the base of the stud and a counter-plate connected to said small plate by fixing elements that pass through said protector.

4. The device according to claim 1, wherein the protector is made of a material that is configured to form a surface adhesive connection with the layer or the surface covering of the cover, wherein said connection is one of a connection by bonding with a connected bonding agent, a cold adhesion connection, and a welding connection, wherein said adhesive surface connection is provided to extend essentially over the entire surface of the protector.

5. The device according to claim 1, wherein each stud consists of two bodies that correspond respectively to the base and to the head, wherein each of said head and said base is equipped with a small plate, with the two bodies comprising screwing ramps that work together and that produce the assembly of said bodies and make it possible to adjust the distance between the small upper plate that equips the head and the small lower plate that equips the base.

6. The device according to claim 1, wherein each stud consists of a base that is formed by a small plate that is extended by or that carries an intermediate connecting body and a head that is formed by a threaded rod or a mechanical connection and an elongated or surface support element that is connected rigidly to said rod or mechanical connection, which itself is connected rigidly to the intermediate connecting body, wherein the threaded rod or mechanical connection allows a height adjustment of the stud that is being considered, with a possibility of locking in position.

7. The device according to claim 5, wherein at least a plurality of the studs comprises a means for damping and/or absorption in the form of a cylinder block made of an elastomer material, located at the base, at the head, or between the base and the head of the stud.

8. The device according to claim 1, wherein the head or the upper portion of each stud is fixed to an elongated or profiled support body, with said elongated or profiled support body comprising individual or continuous anchoring sites for hooking means, either directly elements in the form of plates or panels, or second support elements or profiled rails that carry and hold the elements in the form of plates or panels.

9. The device according to claim 8, wherein the profiled or elongated support bodies of the studs form with the second profiled support elements a two-dimensional framing of support and attachment of the elements in the form of plates or panels.

10. The device according to claim 8, wherein the intermediate mounting parts consist of intermediate fastenings of at least two different sizes, with each fastening having lower hooking feet, designed to be fixed in anchoring sites of the support body, and an upper portion with an inclined mounting site for the second support elements or profiled rails that are designed to carry the elements in the form of plates or panels and to hold them by using second hooking means, with the fastenings of two sizes being arranged according to size in such a way as to allow their respective inclined mounting sites to be located in the same inclined plane.

11. The device according to claim 9, wherein the attachment points of the elements in the form of plates or panels is adjustable in three dimensions, with a possibility of two-dimensional adjustment in a plane that is parallel to the plane of the cover via the framing formed by the profiled support elements of the studs, the second profiled elements, and the sliding hooking means and with possible adjustment in a direction that is essentially perpendicular to the plane of the cover via the studs.

12. A device for fixing elements in the form of plates or panels on a building roof cover, with spacing the elements in the form of plates or panels and the roof cover, said cover comprising on a surface thereof a covering or a sealing layer that is connected to the essentially continuous support that forms the roof, on a layer or a sealing covering that is subjacent, or on a thermal insulation layer that covers this support, the device comprising:

studs for supporting and holding the elements in the form of plates or panels, each of these studs having a base with a small lower plate that is designed to rest on the surface of the cover and to be fixed to the cover, and a head or an upper portion that is designed to support directly or indirectly one or more elements in the form of plates or panels, wherein the small plate of the base of at least a plurality of studs is equipped on the underside with a portion of a plate, panel, membrane or connected sheet forming a protector, whose surface area is at least as large as that of the small plate, wherein each protector is is configured to be linked to the layer or covering by an adhesive connection, and wherein each protector is fixed mechanically to the small plate of the base of the corresponding stud, and at least the upper portion or head of at least a plurality of studs having a larger extension in one direction.

13. The attachment device according to claim 12, wherein each stud comprises a body that has a one-piece structure, with the base and the head being formed from a single piece.

14. The attachment device according to claim 13, wherein the body consists of a metal profiled segment, with the head forming a rail with a central longitudinal groove configured to accommodate hooking means and with two side wings that are located on either side of the groove, forming longitudinal support strips.

15. The attachment device according to claim 12, wherein the mechanical attachment of the protector with the small plate consists of a mechanical attachment that goes through the protector and is combined with a plate or a washer that is designed to press said protector locally against said small plate, with the elongated or profiled support bodies comprising individual or continuous anchoring sites for hooking means.

16. A roofing system with two integrated components comprising a lower airtight cover with a covering or a surface sealing layer and an upper layer that consists of elements in the form of plates or panels, located with spacing from the lower airtight cover, wherein the elements of the upper layer are carried and held on the cover by an attachment device according to claim 1.

17. The system according to claim 16, wherein the surface adhesive connection between the protector and the layer or the covering on the surface of the cover is a connection by bonding, with the bonding agent being an additional connecting agent.

18. The system according to claim 16, wherein a surface adhesive connection between the protector and the layer or the surface covering of the cover is a cold adhesion connection, with the underside of the protector comprising a covering that has suitable properties.

19. The system according to claim 16, wherein a surface adhesive connection between the protector and the layer or the surface covering of the cover is a connection by welding, the protector and the layer or surface covering being based on a bituminous or synthetic sealing membrane.

20. The system according to claim 16, wherein a surface adhesive connection between the protector and the layer or the surface covering of the cover extends essentially over the entire surface of the underside of the protector.

21. The system according to claim 16, wherein the airtight cover has on the surface a bituminous sealing membrane, optionally being part of a sealing complex with two superposed layers, wherein the elements of the upper layer consist of photovoltaic panels.

22. A stud for support and attachment designed to be part of an attachment device according to claim 1, comprising:
- a base with a small lower plate that is designed to rest on and to be fixed to a layer or a sealing covering forming the surface component of a roof cover, and
- a head or upper portion designed to support directly or indirectly one or more elements in the form of plates or panels,
- wherein the small plate of the base is equipped on the underside with a portion of a plate, panel, sheet or connected membrane that forms a protector, whose size or surface area is at least as large as that of the small plate, which is configured to be linked to the layer or covering by an adhesive connection,
- wherein said protector is fixed mechanically to the small plate of the base.

23. The stud according to claim 22, wherein the base and the head form two separate parts that are assembled with one another to constitute the body of said stud, whose height is adjustable.

24. The stud according to claim 22, wherein the base and the head are made of a single piece and together form the one-piece body of the stud, with this body having a profiled composition.

* * * * *